UNITED STATES PATENT OFFICE.

WILLIAM H. ALLEN, OF DETROIT, MICHIGAN.

PROCESS OF PRODUCING FERRIC PHOSPHATES.

1,271,002.  Specification of Letters Patent.  Patented July 2, 1918.

No Drawing.  Application filed September 25, 1916. Serial No. 122,149.

*To all whom it may concern:*

Be it known that I, WILLIAM H. ALLEN, a citizen of the United States, and residing at Detroit, in the county of Wayne and State of Michigan, have invented a new and Improved Process for Producing Ferric Phosphate, of which the following is a specification.

This invention relates to the rust-proofing of the surfaces of articles of iron and steel through the action thereon of aqueous solutions of ferric phosphates, the result being surfaces of basic phosphates on such articles and the changing of the ferric phosphates in solution to inactive ferrous phosphates, and the object of this invention is to provide a novel process whereby ferrous phosphates may be changed to ferric phosphates while in solution.

The patent to Richards No. 1,069,903, dated August 12, 1913, suggests the use of manganese dioxid in the rust-proofing of iron and steel and it has been found that the value of this material lies in the fact that it converts the ferrous phosphates to ferric phosphates. It is an oxidizing agent, but is expensive and objectionable in that it constitutes an inconvenient sediment in the rust-proofing bath.

In the rust-proofing of articles of iron and steel, the bath is usually prepared by acting upon iron or steel with a hot one-half per cent. solution of phosphoric acid. The chemical reaction continues until a point of saturation is reached, that is, until the formation of insoluble ferrous phosphates begins. At this point, the solution is no longer effective for the production of the desired black ferro-ferric basic phosphate surface unless steps are taken for oxidizing the ferrous phosphates.

This solution, after it has settled and become clear, may have a finely divided current of air blown up through it. Or the solution may be permitted to trickle down through a chamber through which a current of air is ascending. Or the solution may be caused to flow in a very thin sheet over flat plates while currents of air pass over it. In each case, because of the comparatively large surface exposed to the air, the acid ferrous phosphates absorb oxygen and form acid ferric phosphates, some of the more insoluble being precipitated. If the solution were evaporated the deposited salt will not redissolve in the amount of water evaporated.

The solution of acid ferric phosphates is intensely active as a rust-proofing agent. The oxidizing treatment of the solution may be continuous with the rust-proofing, that is, the air may be forced through the rust-proofing bath while articles are being treated therein. Or the solution may be circulated through the rust-proofing tank and through an oxidizing chamber where it will be brought in contact with currents of air.

I claim:—

1. The process of converting ferrous phosphates in the presence of phosphoric acid in aqueous solution to ferric phosphates which consists in bringing substantially every part of the same into contact with air.

2. The process of converting ferrous phosphates in the presence of phosphoric acid in aqueous solution to ferric phosphates which consists in passing finely divided currents of air through the solution.

WILLIAM H. ALLEN.